(12) United States Patent
Glöckler

(10) Patent No.: US 7,425,184 B2
(45) Date of Patent: Sep. 16, 2008

(54) MODULAR TRANSMISSION UNIT, IN PARTICULAR MULTISTAGE TRANSMISSION

(76) Inventor: Dieter Glöckler, Bergstrasse 34, Ulm (DE) 89081

( * ) Notice: Subject to any disclaimer, the term of this patent is extended or adjusted under 35 U.S.C. 154(b) by 153 days.

(21) Appl. No.: 10/560,120

(22) PCT Filed: Jan. 20, 2005

(86) PCT No.: PCT/EP2005/000507

§ 371 (c)(1),
(2), (4) Date: Dec. 8, 2005

(87) PCT Pub. No.: WO2005/078314

PCT Pub. Date: Aug. 25, 2005

(65) Prior Publication Data

US 2006/0128514 A1    Jun. 15, 2006

(30) Foreign Application Priority Data

Feb. 12, 2004   (DE) ...................... 10 2004 007 130

(51) Int. Cl.
*F16H 37/02*    (2006.01)

(52) U.S. Cl. ........................ 475/213; 475/212; 475/218

(58) Field of Classification Search ......... 475/210–213, 475/218
See application file for complete search history.

(56) References Cited

U.S. PATENT DOCUMENTS

| 4,392,394 A | * | 7/1983 | Hofbauer et al. | 475/204 |
| 6,106,428 A | * | 8/2000 | Koneda et al. | 475/210 |
| 6,269,895 B1 | * | 8/2001 | Tanuguchi et al. | 180/65.2 |

FOREIGN PATENT DOCUMENTS

| DE | 197 55 612 | 6/1999 |
| DE | 102 02 754 | 2/2003 |
| EP | 1 333 194 | 8/2003 |
| WO | WO 94/15121 | 7/1994 |

* cited by examiner

*Primary Examiner*—Ha D. Ho
(74) *Attorney, Agent, or Firm*—Baker & Daniels LLP

(57) ABSTRACT

A modular transmission unit, in particular multistage transmission, comprising the following components: two superimposed gears as planetary gears, a first shaft of the first superimposed gear integrally coupled in rotation with the box input, a second shaft of the first superimposed gear and a second shaft of the second superimposed gear indirectly coupled with the output. Between the third shafts of the first and second superimposed gears is mounted a continuously variable transmission. The individual coupling of the individual superimposed gears and of the continuously variable transmission is provided by a linking gear including a multiplication and gear reduction stage.

29 Claims, 5 Drawing Sheets

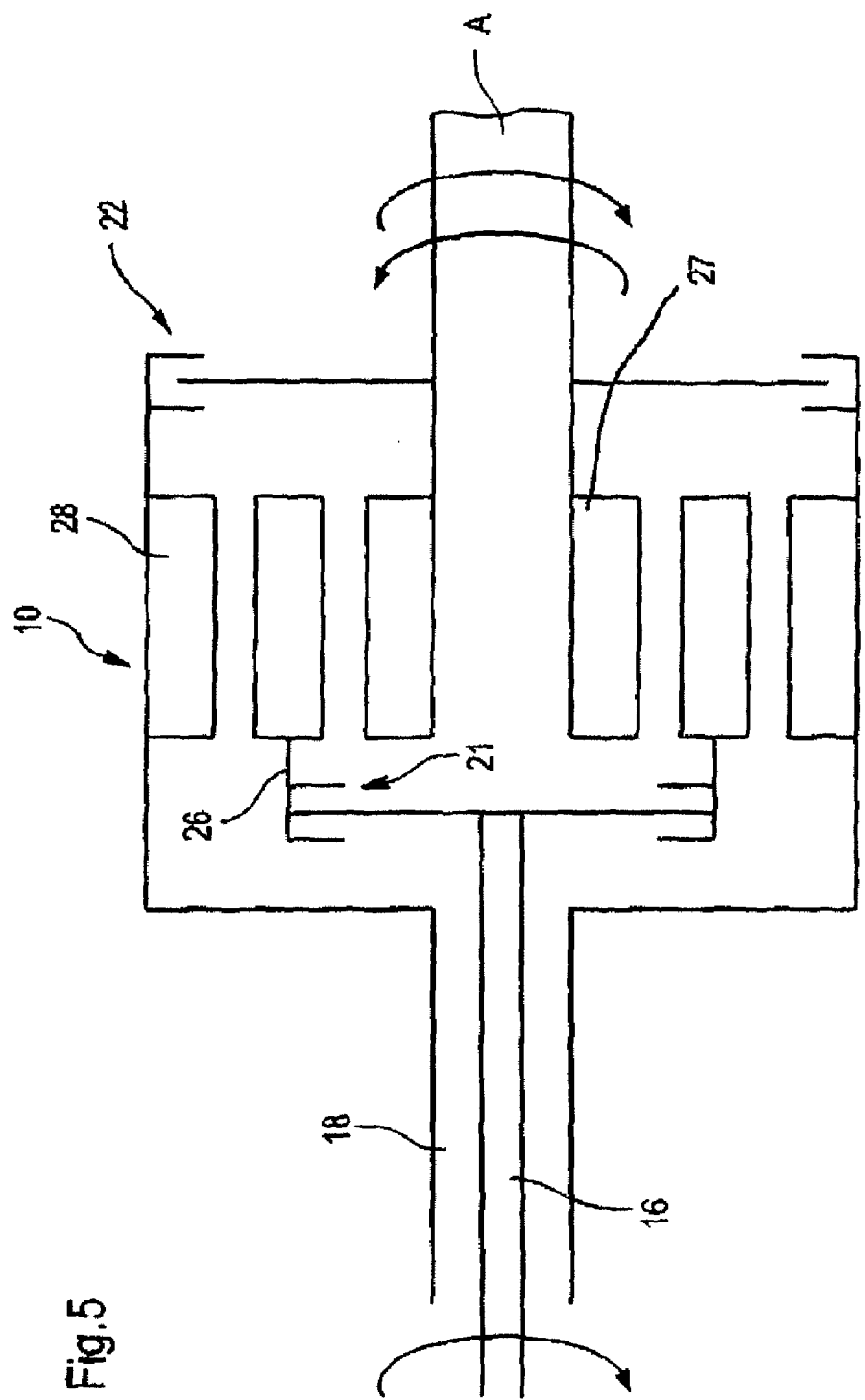

MODULAR TRANSMISSION UNIT, IN PARTICULAR MULTISTAGE TRANSMISSION

BACKGROUND OF THE INVENTION

The invention relates to a modular transmission unit, in particular a multistage transmission.

Transmission devices in the form of power split drives in the form of superimposed gears are known in a number of embodiments. The following documents are examples:

1. EP 1333194

2. DE 197 55 612 A1

The embodiment in accordance with document DE 197 55 612 A1 comprises a gearbox input shaft, a continuously variable transmission gear coupled with the gearbox input shaft and with the gearbox output shaft that has an input and an output, whereby the input is attached to the gearbox input shaft in a torque-transmitting manner, a fixed transmission stage as well as a superimposed gear with a first input shaft, which is attached in a torque-transmitting manner with the output of the continuously variable transmission gear. Furthermore, a second input shaft is provided, which can alternatively be connected to the gearbox input shaft by means of a first clutch via the fixed transmission stage and an output shaft, which is coupled in a torque-transmitting manner with the gearbox input shaft. The fixed transmission stage is hereby coupled in a torque-transmitting manner on the pinion end with the gearbox input shaft and, in terms of the fixed transmission stage on the drive side, the first clutch is arranged such that it alternatively connects the second input shaft of the superimposed gear on the drive side with the fixed transmission gear. With this solution, it is possible to easily make available a reliable multistage transmission. This solution offers the advantage that, in a multistage transmission with a so-called geared-neutral area created through the combination of a continuously variable transmission gear and a superimposed gear, high engagement speeds are avoided in the area of the first clutch, since it is attached to a spot after the corresponding transmission of the high revolution speed of the drive shaft to the low revolution speed through the fixed transmission stage. This reduces the wear and tear and increases the life span of the first clutch. An important advantage exists however in the direct coupling between the continuously variable transmission, also called CVT, and the transmission input and thus the drive shaft. The continuously variable transmission is thus always coupled with revolutions of the drive machine. An offloading of the superimposed gear in an area of higher revolutions per minute of the output shaft or lower transmission ratios of the continuously variable transmission gear is realized in that a second clutch is provided, which alternatively connects the first input shaft with the output shaft of the transmission gear. This creates a rigid connection between the output shaft of the continuously variable transmission gear and the output shaft, whereby the superimposed gear in the torque flow is bridged. Another important problem of the transfer of power over the continuously variable transmission gear is that it can only transfer a maximum permissible torque due to corresponding dimensioning; otherwise, impermissible slip states are to be observed in the case of very high stress levels, which lead to increased wear of the traction mechanism. However, due to the direct coupling of the continuously variable transmission at the box input, it is always exposed to these provided conditions. That is, the input of the CVT is supplied with the revolution speed at the box input and thus the main engine.

A multistage transmission is also known from document WO 94/15121. It comprises a continuously variable transmission in the form of a traction mechanism box as well as two triple-shaft planetary wheel sets, which are combined into a four-shaft planetary wheel set. The coupling of the individual shafts with the continuously variable transmission also occurs via connecting gears here.

A modular transmission unit is known from document EP 1333194 that was modified with respect to its design such that the loading of the traction mechanism box was considerably reduced and thus the transferability of higher power output, in particular higher power output than with DE 19755612 A1, was able to be ensured via its use. In this embodiment, the modular transmission unit is also designed as a superimposed gear unit. This comprises a box input and a box output, as well as two superimposed gears arranged and coupled together between the box input and the box output. Each of the two transmission gears is thereby designed as a three-shaft planetary wheel. Both are coupled together with each other into a four-shaft planetary wheel. A continuously variable transmission in the form of a traction mechanism box is interposed between the first superimposed gear and the second superimposed gear. Each planetary wheel comprises a sun wheel, a hollow wheel, plant wheels and a spacer. The individual shafts are thereby formed by the sun wheel, the hollow wheel or the spacer of the respective superimposed gear. The box input is connected in a torque-transmitting manner with a first shaft of the first superimposed gear and a first shaft of the second superimposed gear. The box output is connected in a torque-transmitting manner with a second shaft of the second superimposed gear and a second shaft of the second superimposed gear. The two three-shaft planetary wheels are coupled into a four-shaft planetary wheel through the coupling of the first and second shafts of the first and second superimposed gears. The continuously variable transmission in the form of a traction mechanism box is arranged between the third shaft of the first and second superimposed gear. The term shaft should thus be understood functionally, whereby this either means the individual elements of the planetary wheel—sun wheel, hollow wheel or spacer—or the elements coupled with them in a torque-transmitting manner, e.g. in the form of shafts or hollow shafts. The individual shafts thereby take on the function of inputs and outputs depending on the operating state. Thus, the first superimposed gear for the transfer of power from the box input shaft to the box output shaft via the continuously variable transmission comprises an input and two outputs. The input is thereby formed by the first shaft, while the first output, which is connected at least indirectly with the continuously variable transmission, is formed by the third shaft, and the second output, connected in a torque-transmitting manner with the box output shaft, is formed by the second shaft. The second superimposed gear comprises in this operating state an input and an output, whereby the input is also coupled with the box input shaft and is formed by the first shaft of the second superimposed gear and the output of the second shaft. The third shaft is connected to the continuously variable transmission. Means for changing the gear transmission ratio on the transmission are also provided. One of the two superimposed gears—first or second superimposed gear—thereby has pairs of intermeshing planetary wheels between the sun wheel and the hollow wheel. These are pivoted on the spacer. The pairs of intermeshing planetary wheels are also called double-barreled planetary wheels. Based on the embodiment of one of the second superimposed gears designed as a planetary wheel with pairs of intermeshing planetary wheels, which are also called double-barreled planetary wheels, it is guaranteed for the sub-area of the full operating range that the CVT works with a maximum velocity of circulation, whereby a switch in terms of the gear transmission ratio to the individual disks can also take place at a maximum engine speed, i.e. is possible via zero turning, and thus a change in the direction of rotation is to be realized with the transmission in accordance with the invention in addition to the geared neutral. The double-barreled design has the advantage that, in the case of an increase in the revolution speed caused by this at the input coupled with the continuously variable transmission, in particular the hollow wheel of this planetary wheel, this causes a decrease determined in accordance with the design of the other planetary wheel on the output of the each of the other planetary wheels coupled with the continuously variable transmission, in particular the hollow wheel. However, in accordance with this design, it is not possible to let the continuously variable transmission operate over the full operating range twice with maximum velocity of circulation.

SUMMARY OF THE INVENTION

Thus, the object of the invention is to make available a design described based on EP 1333194 A1 with the transmission arrangement improved through these achieved advantages, whereby the named disadvantages from the state of the art are overcome and a reliable multistage transmission can easily be provided based on this design in accordance with the invention. In particular, a further reduction of the loading of the traction mechanism box is to be applied.

The solution according to the invention is defined by the claims.

In accordance with an embodiment in accordance with the invention, the modular transmission unit is designed as a multistage transmission. It comprises a gearbox input and a gearbox output, as well as two superimposed gears arranged and coupled together between the box input and the box output. Each of the two superimposed gears is thereby designed as a three-shaft planetary wheel. A continuously variable transmission in the form of a traction mechanism box is interposed between the first superimposed gear and the second superimposed gear. Each planetary wheel comprises a sun wheel, a hollow wheel, planetary wheels and a spacer. The individual shafts are thereby formed by the sun wheel, hollow wheel or spacer of the respective superimposed gear or an element coupled with it in a torque-transmitting manner. The box input is thereby connected in a torque-transmitting manner with a first shaft of the first superimposed gear. In accordance with the invention, a first clutch coupling is provided between the first shaft of the second superimposed gear and the box input. The box output is connected in a torque-transmitting manner with a second shaft of the second superimposed gear and can be connected in a torque-transmitting manner with a second shaft of the first superimposed gear via another second clutch coupling. The arrangement of the continuously variable transmission in the form of a traction mechanism box takes place between the third shafts of the first and second superimposed gears. The term shaft is to be understood functionally, whereby functional is to be understood as either the individual elements of the planetary wheel—sun wheel, hollow wheel or spacer—or the elements connected to it in a torque-transmitting manner, for example in the form of shafts or hollow shafts.

The individual shafts thereby take on the function of inputs and outputs depending on the operating range. Thus, the first superimposed gear during the transfer or power from the gearbox input shaft to the gearbox output shaft via the continuously variable transmission comprises one input and two outputs. The input is thereby formed by the first shaft, while the first output, which is at least indirectly connect with the continuously variable transmission, is formed by the third shaft and the second output connected in a torque-transmitting manner with the box output shaft of the second shaft. The second superimposed gear comprises in this operating state an input and an output, whereby the input is also coupled with the box input shaft and the output of the second shaft. The third shaft is connected with the continuously variable transmission. Means for changing the gear transmission ratio are also provided.

The two planetary wheels are coupled with a four-shaft planetary wheel. The coupling occurs through the torque-transmitting connection between the second shaft of the first superimposed gear and the third shaft of the second superimposed gear.

Each of the couplings between the superimposed gears and the continuously variable transmission are formed via linking gears in the form of multiplication and gear reduction stages. In the simplest case, this occurs via a simple spur wheel set with an even number of spur wheels, whereby the respective input spur wheel can be formed directly by the output of the superimposed gear. Both clutches are clutch couplings; as a general rule, the transfer of power thereby occurs first by switching the first clutch and with synchronicity between the first shaft of the second superimposed gear and the third shaft of the second superimposed gear or the second shaft of the first superimposed gear through the switching of the second clutch and the disengaging of the first one. The clutch engagements can thereby be superimposed or successive depending on the design of the clutches. However, this is preferably performed without interrupting traction and the second clutch is switched when there is synchronicity between the second and third shaft of the superimposed gear. With this embodiment as well, the input of the continuously variable transmission in the form of a traction mechanism box is not connected with the revolution speed of the main engine, i.e. there is no torque-transmitting connection between the input of the modular transmission unit and the continuously variable transmission. This is only realized via the first superimposed gear. Since it is does not experience the fixation of one of its shafts, no fixed transmission ratio is specified by it. The continuously variable transmission thereby operates over the full operating range with a maximum velocity of circulation at maximum engine speed. Through the two clutch couplings and their alternating activation, which results in a bridging of the second superimposed gear, the continuously variable transmission switches, observed over the full operating range, twice with respect to the revolution speed, e.g. in a range from 2000 rpm to 4800 rpm. Depending on the design, a transmission-ratio spread of up to 2.6, for example, can be provided for this.

The clutch switch of the second planetary wheel takes place without interrupting traction. The gearbox input shaft and the third shaft of the second superimposed gear or the second shaft of the first superimposed gear thereby run synchronously.

The hollow wheel and the sun wheel of the two planetary wheel sets can be designed in any manner. However, it is to be taken into consideration in the overall design, in particular of the connection between the outputs and the continuously variable transmission. The overall transmission ratio spread of the transmission can be affected through the design of the second superimposed gear. An increase causes an increase, and a decrease causes a decrease. The first planetary wheel is designed depending on the transmission ratio spread on the CVT, i.e. the hollow wheel and the sun wheel are designed, for example, in the case of a transmission ratio spread of approx. 2.5 to be achieved with the CVT, such that the ratio of the sun wheel to the hollow wheel corresponds with the ratios achieved with the CVT. (Shafts run synchronously during the clutch switch.) That is, the gear transmission ratio between the hollow wheel and the sun wheel is 1:2.5. This means that the sun wheel rotates 2.5 times faster than the hollow wheel. For the constructive design, this means, for example, a 2.5 times large gearing diameter of the hollow wheel than the gearing diameter of the sun wheel.

In accordance with an especially advantageous embodiment, the first shafts of each of the two transmission gears are formed by the spacer of the individual superimposed gears. The second shaft of the first planetary wheel is formed by the sun wheel and the second shaft of the second planetary wheel by the hollow wheel. The third shafts, which are at least indirectly coupled with the traction mechanism box, are formed by the hollow wheel of the first planetary wheel and the sun wheel of the second planetary wheel. During the transmission of power via the continuously variable transmission, as seen from the box input to the box output, the spacer of the first superimposed gear thereby forms the input of the first superimposed gear. The first output, which is coupled with the box output shaft, is then formed by the sun wheel and the second output by the hollow wheel of the first superimposed gear.

The solution in accordance with an embodiment of the invention is characterized in that, in all operating ranges, there is no direct, torque-transmitting coupling between the box input shaft and the continuously variable transmission, in particular each of the disk arrangements functions as an input of the continuously variable transmission, but rather it is realized via a superimposed gear. Thus, due to the coupling between the superimposed gear and the continuously variable transmission, a fixed gear transmission ratio is achieved via a stage, although the individual sizes—revolution speed and torque at the input of the continuously variable transmission are always dependent on the ratios for the first superimposed gear, i.e. with a transmission of power via the traction mechanism box, its size has an influence on the revolution speed of the box output shaft, whereby it in turn has a counter effect on the first superimposed gear and thus the height of the transferable power via the first superimposed gear and the revolution speed of the third shaft of the first superimposed gear. This results in the fact that unnecessarily high stress of the continuously variable transmission at higher revolution speeds is avoided. The input of the continuously variable transmission is thus no longer directly connected to the revolution speed at the box input and thus the main engine coupled with it. The revolution speed at the box output of the modular transmission unit can be modified by controlling the continuously variable transmission. A multistage transmission, which is characterized by the utilization of the transmission range of the continuously variable transmission in each of the individual operating ranges, is achieved through the provided switchability of the two clutches. That is, the continuously variable transmission is run through in each operating range. The overall transmission ratio spread of the transmission increases through the same-sized or smaller dimensioned traction mechanism boxes.

The continuously variable transmission can be designed in many ways. It is preferably designed as a force-fit traction mechanism gear. This comprises two disk arrangements, a first disk arrangement and a second disk arrangement, whereby the individual disks, preferably at least one of them can be pushed against each other in order to modify the gear transmission ratio. Belts, chains and push link conveyors can be used as traction mechanisms.

The means for controlling the gear transmission ratio comprise, if the traction mechanism gearbox is designed with two disk arrangements, whereby the distance between the disks of one disk arrangement can be varied by the down force of the disks of one disk arrangement and the size is used as a direct control factor or a factor at least characterizing it indirectly, corresponding control devices for the admission of the individual disks or for their displacement. These can be operated, for example, electro-hydraulically. A corresponding control device for the active modification of the run radius for the traction mechanism can either be assigned to only one disk arrangement, whereby the other disk arrangement is assigned, for example, pretensioned spring devices, which enable an automatic adjustment of the down force and thus the adjustment of the run radius according to the modification of the distance between the individual disks and thus the run radius at the disk arrangement actively controllable by means of the control device. Another option is the activation of both disk arrangements. With respect to the specific embodiment, there are a number of options already known from the state of the art, which, for this reason, should not be covered in greater detail.

The functionality of the transmission arrangement in accordance with the invention is designed as follows:

In the case of the coupling of the gearbox input on the main engine or in the case of an integrated starter unit and coupling of the box input on the first superimposed gear of the box output shaft, i.e. of the output of the entire transmission unit and the first clutch coupling, the ratios on the first superimposed gear are designed like with a planetary wheel with a second shaft working against a countercheck. The second clutch on the second superimposed gear is disengaged. Correspondingly, a transmission of power takes place via the first superimposed gear and a transmission gear via a disk arrangement of the traction mechanism box coupled with it. The same is true for the second superimposed gear, the first shaft of which, in this case the spacer, is coupled with the input of the modular transmission unit. This means that, in this state, both disk arrangements of the continuously variable transmission are actuated. The first superimposed gear thus functions as a transfer box, the input of which is coupled with the box input shaft, the first output of which is couple with the traction mechanism box and the second output of which is coupled with the box output shaft for the second superimposed gear. The second superimposed gear unit in this state also functions as a transfer box, whereby the input is coupled with the box input shaft and the output with the second disk arrangement of the continuously variable transmission. The gear transmission ratio between the first disk arrangement and the second disk arrangement is selected in this functional state, for example at a ratio of 1 to 2 through 2.6, in particular 1 to 2.4. The second output of the second superimposed gear is connected in a torque-transmitting manner with the output of the modular transmission unit. This means that the second disk arrangement coupled with the second superimposed drive rotates faster than the first one connected with the first superimposed gear. Only when the gear transmission ratio on the continuously variable transmission is changed via the appropriate means for the adjustment of the gear transmission ratio, i.e. is converted to slow from the transmission between the first and second disk arrangements in the direction of a transmission, i.e. for example from 1 to 2.4 to 2.4 to 1 (switch of the disks in the revolution speed) and thus less torque is transferred via the first disk arrangement, the transmission of power mainly occurs via the first superimposed drive to the traction mechanism box, whereby the power is fed to the second superimposed gear via the continuously variable part. In this case, the second superimposed gear functions as a summation gear with two inputs, which are formed by the first and the third shaft. Accordingly, the box output shaft is actuated based on the actuation of the hollow wheel of the second superimposed drive and the rotation of the spacer. In order to create another area with quasi pure continuously variable power transmission, the second clutch coupling is switched in the case of synchronicity between the box input shaft and the third shaft of the second superimposed gear. The first is then disengaged. In this case, the transmission of power occurs in the case of quasi coupled sun wheel and hollow wheel without additional transfer on the second superimposed gear according to the set transfer at the continuously variable transmission via the first superimposed gear. The second superimposed gear is bridged. By changing the gear transmission ratio at the continuously variable transmission, in particular based on its connection with the first superimposed gear from slow to fast and fast to slow, the potential operating range of the continuously variable transmission is thus run through twice, i.e. depending on the setting of the gear transmission ratio, in both directions. The overall operating range of the transmission is thus increased through each of the two run-throughs of the operating range of the CVT in each of the two operating ranges, which are characterized by the switching of the individual clutches. The CVT itself can be sized smaller in the case of constant power to be transferred via the entire transmission.

The design of the provided multiplication and gear reduction stages between the first and second superimposed gears and the continuously variable transmission (CVT) takes place according to the maximum permissible revolution speed of the CVT.

For the solution according to the invention, a control is also provided that changed the gear transmission ratio on the traction mechanism box, in particular by changing the distances between the disks of a disk arrangement. This occurs, for example, depending on the engine speed, the desired revolution speed at the box output shaft of the gas pedal position as well additional actuating variables. With respect to steering, there are a number of options, whereby conventional ones can be used.

To reverse the direction of rotation, a reverse gear or a corresponding arrangement can be provided, which enables a reversal of the direction of rotation of the box input shaft. However, furthermore, it is also possible to take full advantage of the transmission-ratio spread range and drive the superimposed gear over neutral in accordance with a second solution approach described further below.

Furthermore, a starter unit, as already described, for example in the form of a hydrodynamic converter, a hydrodynamic clutch or a mechanical clutch, for example in the form of a wet multiple-disk clutch are assigned to the modular transmission unit according to the invention in order to not transfer the entire load to the continuously variable transmission during startup.

In accordance with a particularly advantageous further development, resulting slippage on the continuously variable transmission at high engine speeds can be prevented through means for the non-slip coupling and thus the adjustment of the velocity of circulation at the traction mechanism to the revolution speed of the drive shaft.

The means for the non-slip coupling of the traction mechanism to the revolution speed of the box input comprises a transfer element coupled at least indirectly with the box input and actively connected in a force-fit manner with the traction mechanism. The outer perimeter of the traction mechanism is provided with a profile that meshes with a complementarily designed profile on the outer perimeter of the transfer element. Another option is designing the traction mechanism as a chain or as a combination of a belt and a chain, whereby the transfer element is then designed as a sprocket wheel, i.e. that execution occurs continuously through unchanged positioning of the transfer element with respect to the traction mechanism. Adjustments of the traction mechanism for run radius changes during the displacement of the disks of the continuously variable transmission and synchronous adaptation of the velocity of circulation of the traction mechanism to the revolution speed of the box input are balanced via a tensioning device, in particular a tension pulley, in accordance with the first solution approach. The tension pulley can thereby be pivoted with respect to the traction mechanism and fixed in a stationary manner. The transfer element is thereby is at least indirectly coupled with the box input. This means that the transfer element is either couple in a torque-transmitting manner with the box input or is couple with it via other transfer elements. In order to ensure a rotation of the transfer element with the same direction of rotation as the running direction of the traction mechanism, it is either directly connected in a torque-transmitting manner with the drive shaft or the box input or via other transfer elements such as a spur wheel set, whereby the number of intermeshing transfer elements is then uneven. The transfer elements can also be arranged to pivot with respect to the traction mechanism. They then simultaneously serve as a tensioning element and for the non-slip coupling with the revolution speed on the box input. If the actuating belt pulley has a smaller run radius than the one on the output side, the actuating belt pulley can transfer less torque than the one on the output side. As soon as the slip limit of the actuating belt pulley has been reached, the torque to be transferred to the output belt pulley is transferred from the gear wheel on the belt and from there to the output belt pulley.

In accordance with a second solution approach, the equalization of the deviations, resulting from different displacements of the two disk arrangements, i.e. uneven displacement, of the traction mechanism run lengths from the length theoretically required in this state for the secure transfer of torque through the pivotability of the disk arrangements around the transfer element takes place for the taut and non-slip guidance of the traction mechanism. The shaft connected in a torque-transmitting manner with the disk arrangements and the elements connected with them—output of the first fixed transfer stage and input of the second fixed transfer stage—are also pivoted. The pivot radius is hereby determined. The pivoting always occurs in the direction or around the transfer element in the circumferential direction.

With certain transmission designs according to another solution approach, operation is possible via neutral. Otherwise, a reverse switch is provided for change the direction of rotation.

BRIEF DESCRIPTION OF THE DRAWINGS

The invention is explained below based on drawing figures. The individual figures show the following:

FIG. 5 shows an alternative embodiment of the coupling of the superimposed gear with the continuously variable transmission, which enables rotation in neutral.

DETAILED DESCRIPTION

Figure 1:
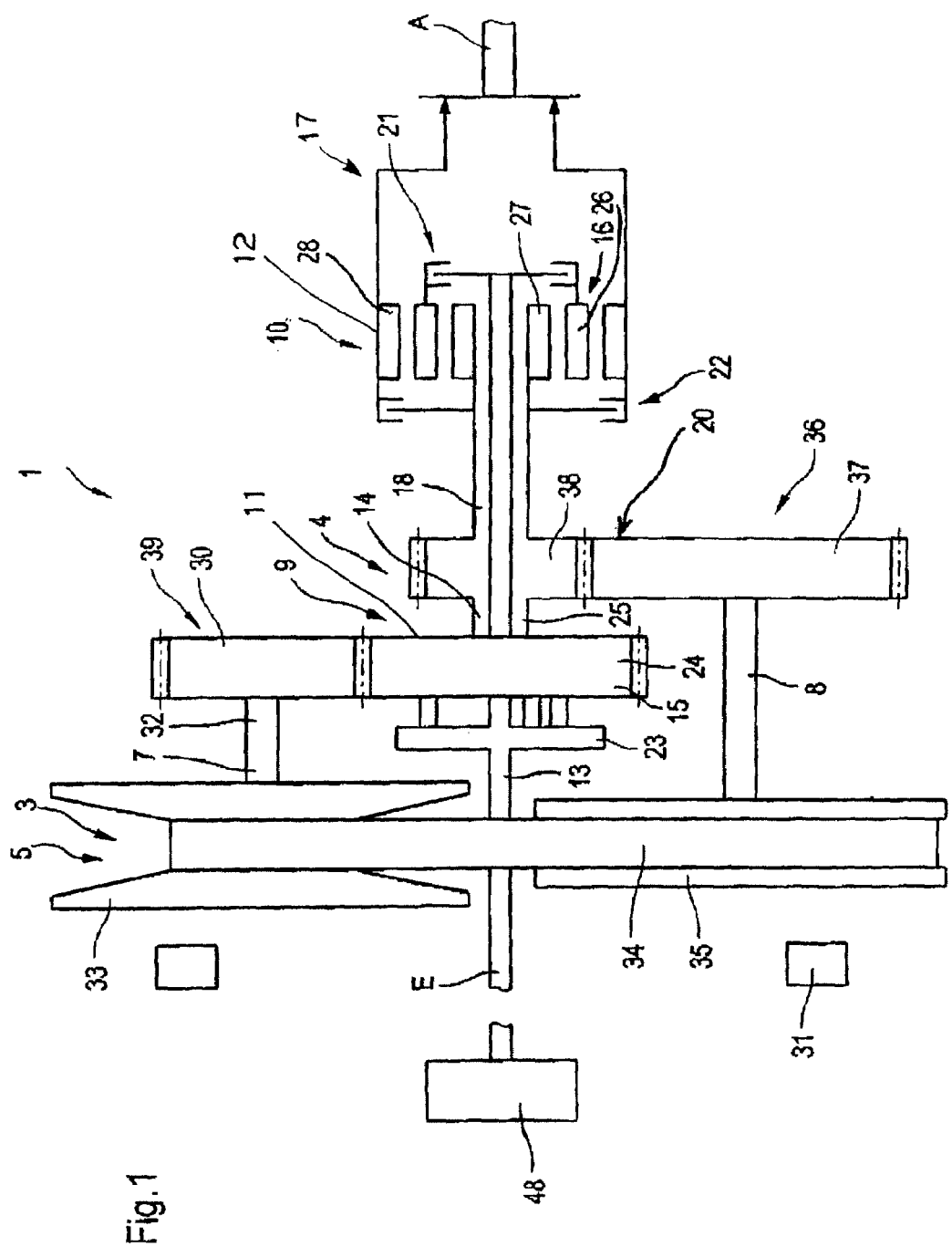
FIG. 1 shows an embodiment of a modular transmission unit in accordance with the invention.

FIG. 1 shows a simplified schematic representation of the basic structure of a modular transmission unit 1 designed according to the invention in the form of a superimposed gear unit, in particular in the form of a multistage transmission. This comprises a gearbox input E and a gearbox output A. The box input E is connected at least indirectly with a main engine, while the output, when used in vehicles, can be coupled at least indirectly with the wheels of the vehicle to be actuated. The transfer of power between the input E and the output A takes place in the individual operating ranges, preferably at least two operating ranges each using two power branches, a first power branch 3 and a second power branch 4. In accordance with the invention, a continuously variable transmission 5 in the form of a traction mechanism gearbox is provided in the first power branch 3, whereby the input 7 of the continuously variable transmission 5, functioning as the input in at least one operating range, of the continuously variable transmission 5 is free of a direct coupling with the box input E and thus the coupling with the main engine. There is, in particular, no set gear transmission ratio between the box input E and the continuously variable transmission 5. The respective output 8 of the continuously variable transmission 5 is free of a direction coupling with the box output A. Two superimposed gears 9 and 10 are provided between the box input E and the box output A for this purpose. The two superimposed gears—a first superimposed gear and a second superimposed gear—are designed as three-shaft planetary wheels 111 and 12. Each planetary wheel—a first planetary wheel 11 forming the first superimposed gear and a second planetary wheel 12 forming the second superimposed gear—comprises a first shaft, a second shaft and a third shaft. For the first planetary wheel 11, the first shaft is labeled with the number 13, the second shaft with the number 14 and the third shaft with the number 15, while, for the second planetary wheel 12, the first shaft is labeled with the number 16, the second shaft with the number 17 and the third shaft with the number 18. The first shaft 13 of the first planetary wheel 11 is thereby connected in a torque-transmitting manner with the input E of the modular transmission unit 1 or is formed by it. The second shaft 14 can be connected with second planetary gear 12 and the third shaft 15 can be connected with the continuously variable transmission 5 at least indirectly, preferably via a linking gear 39, forming a transmission stage 39. This also applies to the second superimposed gear 12 in the form of the second planetary wheel 12. The first shaft 16 can be connected with the input E of the modular transmission unit 1, whereby the connection in the case shown takes place via the connection with the first shaft 13 of the superimposed gear 11. The third shaft 18 can be connected at least indirectly with the continuously variable transmission 5. The connection takes place via a linking gear 20, comprising a transmission stage 20. The transmission stages 39 and 20 thereby have a fixed transmission. The second shaft 17 is connected in a torque-transmitting manner with the output A of the module transmission unit 1. In accordance with the invention, the first superimposed gear 11 and the second superimposed gear 12 in the individual operating ranges are alternately used as distributor and transfer box and as summation gear. In order to realize the multistage functionality, two clutch couplings 21 and 22 are assigned to the second superimposed gear 12 and alternately connect the first shaft 16, 26 with the input E of the modular transmission unit 1 or the first superimposed gear 9 and a second clutch coupling 22, which alternately connects the third shaft 18 with the output A of the modular transmission unit 1 and thus the output A with the continuously variable transmission 5 via the second transmission stage 20. The individual functions of the first shaft, second shaft and third shaft of the individual planetary wheels 11, 12 are thereby formed for the first planetary wheel 11 by a spacer 23, the function of the second shaft 14 for the connection with the second superimposed gear 12 and via it with the output A by the sun wheel 25. The third shaft 15 is formed by the hollow wheel 24. The function of the first shaft 16 of the second transmission gear 9, 12 is formed by spacer 26, the function of the second shaft 17 by the hollow wheel 28 and the function of the third shaft 18 by the sun wheel 27. The first clutch coupling 21 thereby serves to connect the spacer 26 of the second superimposed gear 12 and the input E of the modular transmission unit 1, while the second clutch coupling 22 of the coupling between the continuously variable transmission 5, in particular the second transmission stage 20 and the output A of the modular transmission unit 1. The continuously variable transmission is designed as a traction mechanism box 6. This comprises two disk arrangements 33 and 35 as input or output of the continuously variable transmission 5. The functionality is designed as follows:

The first clutch 21 is closed in the first operating range. In this case, there is a direct connection between the box output E and the first shaft 16 of the second superimposed gear 12. In this case, the first superimposed gear 11 functions as a transfer box and the second superimposed gear 12 as a pure summation gear. The power flow is conducted via the first shaft 16 of the second superimposed gear 12, the second transmission stage 20 and the continuously variable transmission 5, whereby the revolution speed at output A of the modular transmission unit is determined via the third shaft 18 through the reaction via the first superimposed gear 9. With this solution, it is thus possible that, for one, the advantageous properties of the arrangement named in document EP 1 333 194 are retained and the load on the traction mechanism box 6 is reduced. Thus, based on the coupling between the superimposed gear 9 and the continuously variable transmission 5, a fixed gear transmission ratio is achieved via a stage 39, although the individual sizes—revolution speed and torque—at continuously variable transmission 5 always depend on the ratios at the first superimposed gear 9 and the switch of the individual couplings 21, 22. That is, during the transfer of power via the traction mechanism box 6, the size of the revolution speeds set and achieved there affect the revolution speed at the box output shaft A, whereby this in turn also has an affect on the first superimposed gear 111 and thus the height of the transferable power via the first superimposed gear 11 and the revolution speed of the third shaft 15 of the first superimposed gear 11. This results in the fact that the unnecessarily high stress on the continuously variable transmission 5 is avoided at higher revolution speeds. The input of the continuously variable transmission 5 is thus no longer directly coupling with the revolution speed of the main engine. The revolution speed at the output can be change by controlling the continuously variable transmission 5. The coupling between each of the individual disk arrangements 33, 35 of the continuously variable transmission 5 with the superimposed gears 11, 12 takes place via corresponding linking gears 39, 20 with fixed gear transmission ratios. The means 31 for controlling the gear transmission ratio 33, 35 even at the disk arrangements comprise, if the traction mechanism box 6 is designed with two disk arrangements 33, 35, whereby the distance between the disks of one disk arrangement 33, 35 can be varied by the down force of the disks and this size is used as a direct control factor or a factor at least characterizing it indirectly, a corresponding control device for the variation of the down force, i.e. control devices for the admission of the individual disks or for their displacement. These can be operated, for example, electro-hydraulically. A corresponding control device for the active modification of the run radius for the traction mechanism can either be assigned to only one disk arrangement 33 or 35, whereby the other disk arrangement 33 or 35 is assigned, for example, pretensioned spring devices, which enable an automatic adjustment of the down force and thus the adjustment of the run radius according to the modification of the distance between the individual disks and thus the run radius at the disk arrangement actively controllable by means of the control device 33 or 35. Another option is the activation of both disk arrangements, here the disk arrangements 33 and 35. With respect to the specific embodiment, there are a number of options already known from the state of the art, which, for this reason, should not be covered in greater detail. This also applies to the procedure for manual activation and the determination of the control rules and command variables for the operation of the traction mechanism box as well as the inclusion of its existing drive concepts. In terms of the design of the continuously variable transmission 5, there are a number of options. The coupling of both disk arrangements 33 and 35 and the transfer of power each take place via a traction mechanism 34, for example in the form of a belt, a chain or a push link conveyor.

In a second operating range II, the first coupling 21 between the continuously variable transmission and the box output A is deactivated and the second coupling 22 is closed. In this case, there is a torque-transmitting connection between the box output A with the third shaft 18 of the second superimposed gear 12 and thus the fixed transmission stage 20, whereby this is also connected with the second shaft 14 of the first superimposed gear 9. Hollow wheel 28 and sun wheel 27 of the second superimposed gear 12 are thereby connected together. The transmission range of the continuously variable transmission 5 is thereby used another time in order to achieve a higher transmission ratio spread, whereby the stress on the continuously variable transmission is reduced. The transfer of power thereby occurs from the box input E via the first superimposed gear 9 via the first transmission stage 39 to the continuously variable transmission 5. In the case illustrated here, the first transmission stage 39 is designed as a spur-wheel stage, whereby the first spur wheel is formed by the hollow wheel 24 of the first superimposed gear, while the second one is connected with this intermeshing spur wheel 30 with the shaft 32 functioning in this state as input 7 of the continuously variable transmission or an element, coupled in a torque-transmitting manner with the first disk arrangement 33, of continuously variable transmission 5. The transfer of power takes place via the traction mechanism 34 to a second disk arrangement 35, which is in turn connected with the third shaft 18 of the superimposed gear 12 via the second transmission stage 20 in the form of a spur wheel set 36. The spur wheel set 36 here also comprises two spur wheels, whereby the first spur wheel 37 is connected with the second disk arrangement 35, while the second spur wheel 38 is connected with the third shaft 18 of the second superimposed gear 12. A modification of the distance between the disks of the first and second disk arrangements 33 and 35 for the achievement of the desired gear transmission ratios also occurs in this functional state.

Through the coupling between sun and hollow wheel 27 or 28, the second superimposed gear 12 runs with a transmission of 1:1. The transmission of the entire transmission is determined in this operating range mainly via the continuously variable transmission 5. A change of the gear transmission ratio thereby occurs according to the control of the individual disk arrangements. Even here, the potential operating range of the continuously variable transmission is used through corresponding adjustment of the disks. This takes place, for example, starting from the disk arrangement coupled with the first superimposed gear to fast and then from fast to slow.

The transmission 1 is preferably coupled via a starter unit with the output or the main engine.

The first superimposed gear 11 and the second superimposed gear 12 are designed as already described as a planetary gear transmission in the form of planetary wheel gears 11 and 12. They each comprise at least one sun wheel 25, one hollow wheel 24 and one spacer 23 and planetary wheels. The sun wheel 25 and the hollow wheel 24 are thereby connected together via simple planetary wheels. The same thing also applies to the second planetary wheel 12.

Figure 2:
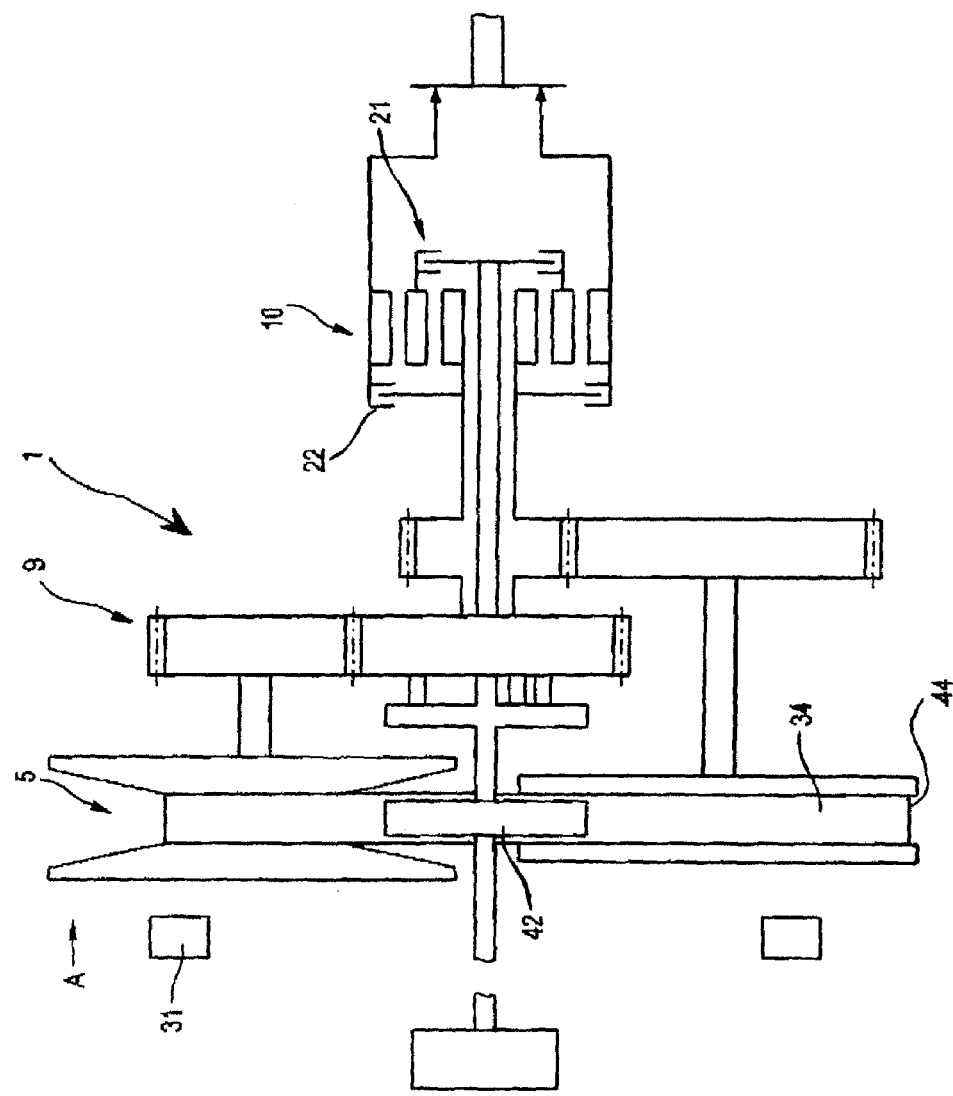
FIG. 2 shows an advantageous further development in accordance with FIG. 1.

FIG. 2 shows, based on a version in accordance with FIG. 1, a special advantageous embodiment of the modular transmission unit 1 designed according to the invention for the realization of the transmission of high torque values in the form of a multistage transmission. The basic structure thereby corresponds with that described in FIG. 1, which is why the same reference numbers are used for the same elements. The continuously variable transmission 5 is also designed as a force-fit traction mechanism box. In accordance with the invention, the traction mechanism 34 on the outer perimeter is provided with a profile 44, which allows the engagement of a transfer element 42, coupled at least indirectly in a torque-transmitting manner with the box input E, with profile 45, designed complementary to profile 44, and thus the synchronous equalization of the velocity of circulation of the traction mechanism 34 at the box input E at any gear transmission ratio between the box input E and the box output A. This measure offers the advantage that more power, e.g. approx. three times more power, can be transferred than without it, with the same sizing of the traction mechanism. Slip states on the traction mechanism are avoided. Gear or chain wheels are used as transfer element 42 according to the selection of the traction mechanism. The circumferential length changes are equalized via a tensioning device (not shown here), for example a tension pulley 47. The gear wheel prevents the slip on the small run radius of the CVT. Both disk arrangements transfer torque (large and small run radius).

Figure 3:
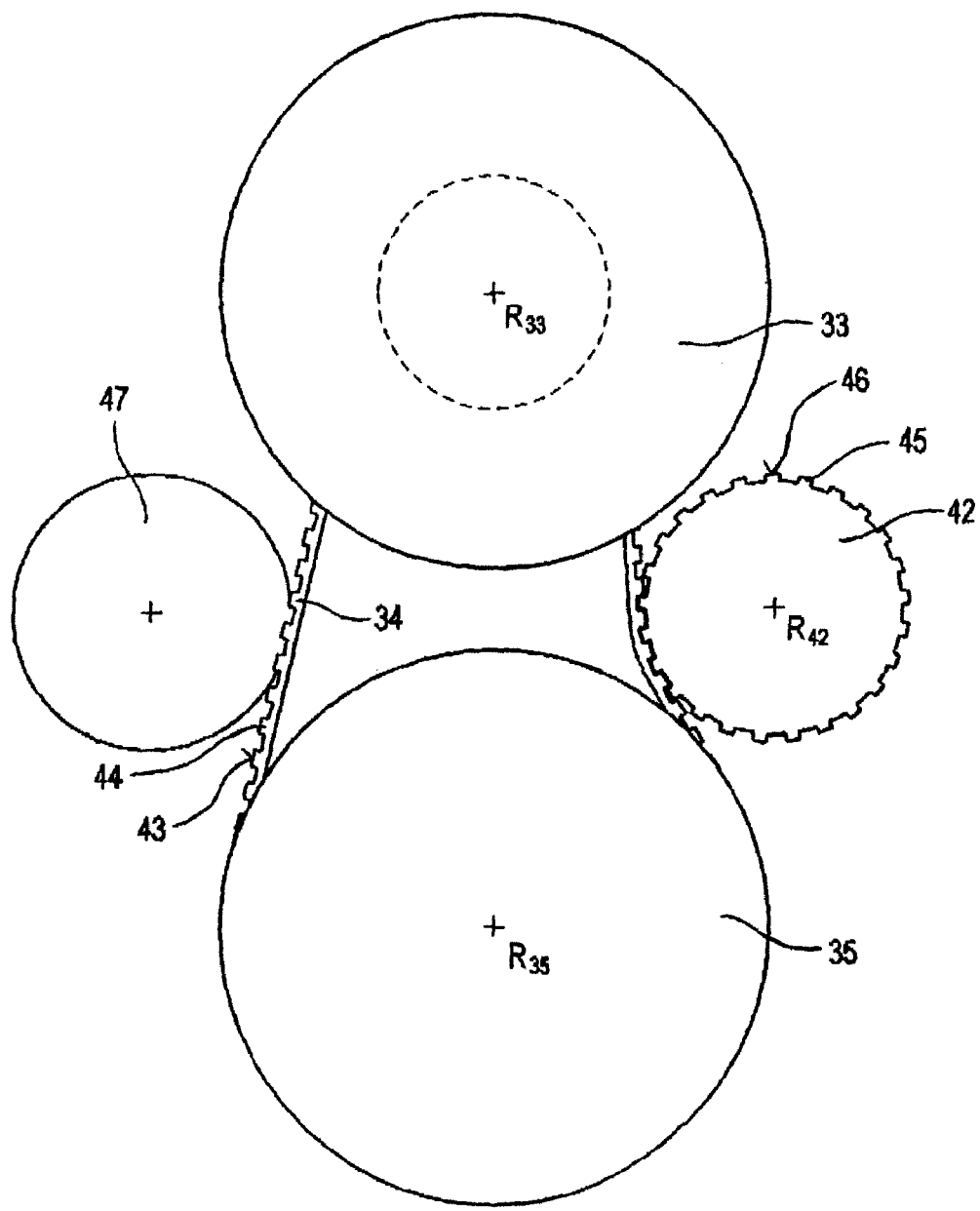
FIG. 3 shows a view A of the disk arrangements in accordance with FIG. 2.

FIG. 3 shows a simplified schematic view A of the traction mechanism in accordance with FIG. 2, which is arranged in one plane parallel to drive shaft E. It can be seen that the traction mechanism 34 has, for example, profiles 44 on the outer perimeter. This can be incorporated into the traction mechanism or can be formed through appropriate designing, for example the design of the traction mechanism with several layers. The traction mechanism is preferably designed as a timing belt. The transfer element 42 is designed as a gear wheel and has a correspondingly complementary profile 45 on its outer perimeter 46, which enables it to mesh with the traction mechanism and to work together with it in a force-fit manner. However, a chain design is also possible. In this case, the transfer element 42 is then designed as a chain wheel.

The transfer element 42 is preferably connected in a torque-transmitting manner with the box input E functioning as a drive shaft and enables a synchronous equalization of the velocity of circulation of the traction mechanism to the revolution speed of the main engine or the box input E in connection with a tensioning device 47. A slipping of the traction mechanism is thereby avoided. However, it is also possible that the means for non-slip coupling with the revolution speed of the drive shaft are designed with a number of interconnected transfer elements, whereby an appropriate transmission always needs to be selected, preferably one that is uneven, in order to guarantee the consistency of the direction of rotation between the box input and the run direction of the traction mechanism. The engagement is always continuous. The transfer elements can attached in a pivoting manner. They then simultaneously serve as a tensioning element for the synchronous coupling of the traction mechanism with the box input.

Figure 4:
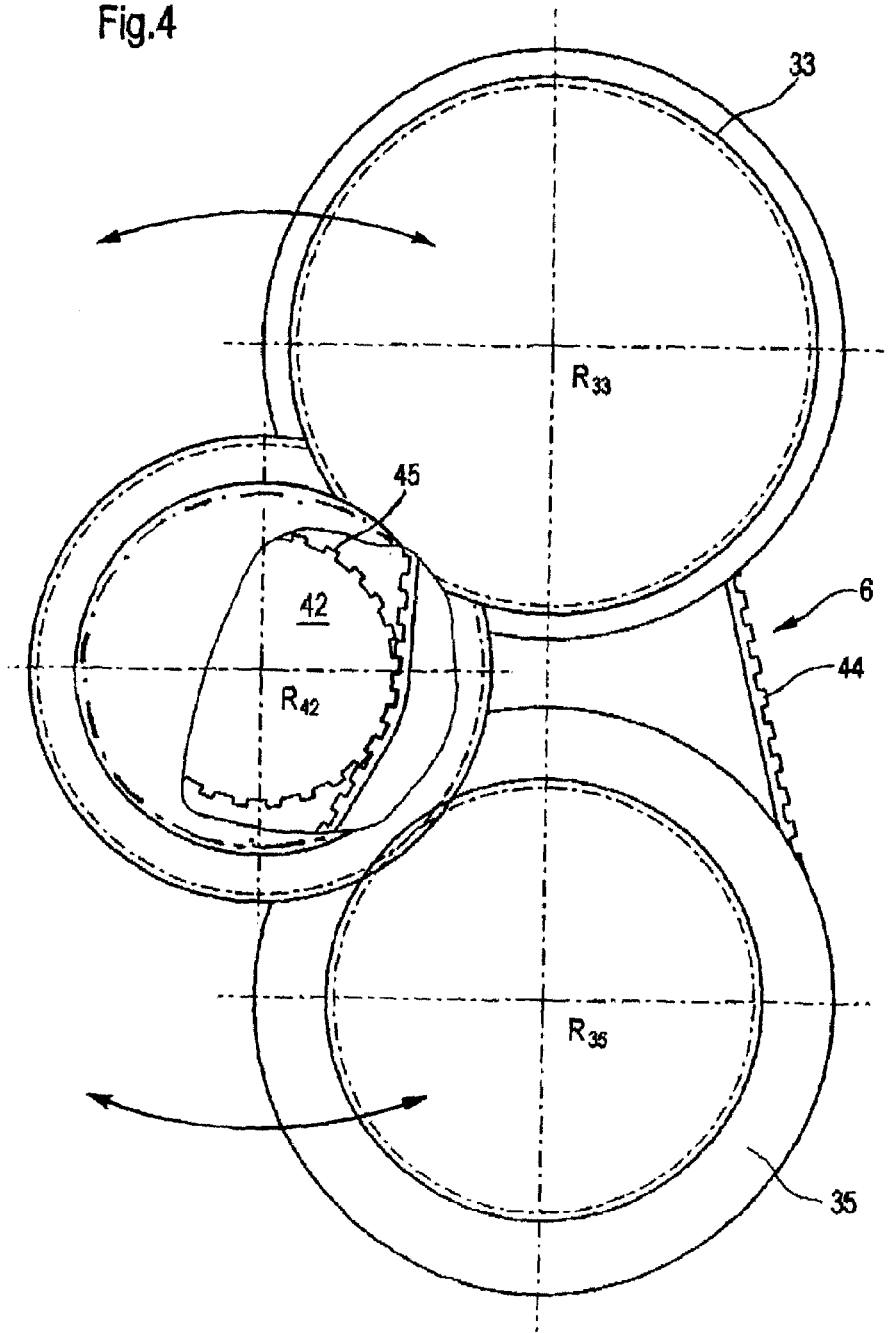
FIG. 4 shows a simplified schematic representation of an alternative embodiment of the means for equalizing the velocity of circulation on the traction mechanism for the revolution speed on the box input or the main engine based on a view A in accordance with FIG. 2.

FIG. 4 shows a view A in accordance with FIG. 2 of another embodiment option for the realization of the tension at the traction mechanism and equalization of the velocity of circulation of the traction mechanism to the revolution speed of the transfer element 42. The traction mechanism is also provided with a profile 44, which is not described in detail here, which is in interconnected with a complementary profile 45 on the transfer element 42. The transfer element 42 is connected in a torque-transmitting manner with the drive shaft or the box input E and enables the synchronous equalization of the velocity of circulation of the traction mechanism to the revolution speed of the drive shaft or the box input E. In order to realize the tension required for the transfer of power at the traction mechanism when modifying at least one of the disk arrangements or both, these are pivoted in the circumferential direction. The pivoting takes place based on the axis of rotation $R_{42}$ of the transfer element at a radius, which is determined through the distance between axis of rotation $R_{42}$ and axes of rotation $R_{33}$, $R_{35}$ of the individual disk arrangements 33, 35. A pivot gear, which is designed as a spur-wheel stage and comprises two spur wheels arranged coaxially to the disk arrangements and that intermesh with a spur wheel arranged coaxially to the transfer element 42, is e.g. provided for this. The spur wheel is fixed with respect to its axis of rotation. The modification or the pivoting thereby takes place synchronously to the modification of the distances on the individual disk arrangements. The distances between the axes of rotation $R_{33}$, $R_{35}$ are thereby changed in the radial direction.

The embodiments shown in FIGS. 1 through 4 concern a multistage transmission. However, a lower transmission ratio spread than in FIGS. 1 through 4 can also be achieved already in that the second superimposed gear is not used. The basic structure of the modular transmission unit is the same as that described in FIG. 1, however without a second superimposed gear.

In the embodiments described in FIGS. 1 through 4, the dimensioning of the superimposed gear, in particular the first superimposed gear, takes place according to the ratios set in the disk arrangements. This means that if, for example, a maximum gear transmission ratio of 1 to 2.5 can be achieved in the continuously variable transmission, the first superimposed gear, in particular the design of the sun wheel and the hollow wheel, will also take place according to these specifications. Specifically, this means that the hollow wheel rotates 2.5 times slower than the sun wheel.

In order to also be able to achieve operation via neutral, the second superimposed gear is designed differently in accordance with FIG. 5 and another second solution approach. In this case, the first shaft 16 of the second superimposed gear 10 is formed by the spacer 26, which can be connected with the box input E via a first coupling 21. However, the second shaft is formed by the sun wheel 37, while the third shaft, which can also be connected with the continuously variable transmission and which is labeled with the number 18, is coupled with the hollow wheel 28. The third shaft 18 can be connected in a torque-transmitting manner with output A via the second coupling device 22. In this case, hollow wheel 28 and sun wheel 27 are coupled together in a torque-transmitting manner.

KEY TO THE DRAWINGS

1 Modular transmission unit
2 Multistage transmission
3 First power branch
4 Second power branch
5 Continuously variable transmission
6 Traction mechanism box
7 Input of the continuously variable transmission
8 Output of the continuously variable transmission
9 First superimposed gear
10 Second superimposed gear
11 Three-shaft planetary wheel
12 Three-shaft planetary wheel
13 First shaft
14 Second shaft
15 Third shaft
16 First shaft
17 Second shaft
18 Third shaft
20 Transmission stage/linking gear
21 First clutch coupling
22 Second clutch coupling
23 Spacer of the planetary wheel 11
24 Hollow wheel of the planetary wheel 11
25 Sun wheel of the planetary wheel 11
26 Spacer of the planetary wheel 12
27 Sun wheel of the planetary wheel 12
28 Hollow wheel of the planetary wheel 12
29 First spur wheel
30 Second spur wheel
31 Means for controlling the gear transmission ratio
32 Shaft
33 First disk arrangement
34 Traction mechanism
35 Second disk arrangement
36 Front chinks
37 First spur wheel
38 Second spur wheel
39 Transmission stage/linking gear
41 Means
42 Transfer element
44 Profile
45 Profile
46 Profile
47 Tensioning device
48 Main engine
E Input
A Output

The invention claimed is:

1. A modular multistage transmission, comprising:
a gearbox input and a gearbox output;
first and second superimposed gears designed as three-shaft planetary wheels each comprising a sun wheel, a hollow wheel, a spacer and planetary wheels, whereby individual shafts are formed by the sun wheels, hollow wheels, spacers or elements connected with them in a torque-transmitting manner;

a first shaft of the first superimposed gear connected in a torque-transmitting manner with the gearbox input;

a second shaft of the first superimposed gear and a second shaft of the second superimposed gear connected at least indirectly with the gearbox output;

a continuously variable transmission in the form of a traction mechanism box arranged between third shafts of the first and second superimposed gears;

means for controlling the gear transmission ratio at the traction mechanism box;

couplings between individual of the superimposed gears and the continuously variable transmission taking place through a linking gear comprising a transmission stage;

the first shaft of the second superimposed gear being connected selectively with the gearbox input via a first clutch coupling;

the second shaft of the first superimposed gear and the third shaft of the second superimposed gear being connected selectively with the gearbox output via at least one other second clutch coupling.

2. The modular transmission in accordance with claim 1, wherein the second shaft of the first superimposed gear is connected in a torque-transmitting manner with the third shaft of the second superimposed gear.

3. The modular transmission in accordance with claim 1, wherein an individual linking gear is formed by a reverse gear.

4. The modular transmission in accordance with claim 3, wherein the individual linking gear is formed by a spur-wheel stage comprising an even number of intermeshing spur wheels.

5. The modular transmission in accordance with claim 4, wherein one of the intermeshing spur wheels of the individual linking gear are formed by the third shaft of the first superimposed gear and/or the third shaft of the second superimposed gear or form one structural unit with them.

6. The modular transmission in accordance with claim 1, wherein the sun wheel of the second superimposed gear is created depending on the overall transmission ratio spread to be achieved.

7. The modular transmission in accordance with claim 1, wherein the first superimposed gear is designed with the continuously variable transmission, which corresponds with a theoretical maximum permissible gear transmission ratio at the continuously variable transmission.

8. The modular transmission in accordance with claim 1, wherein with respect to its sizing, the sun wheel of the first superimposed gear is characterized by a pitch circle diameter that is in the range of 2 to 2.6 times smaller than that of the hollow wheel of the first superimposed gear.

9. The modular transmission in accordance with claim 1, wherein with respect to its sizing, the sun wheel of the second superimposed gear is characterized by a pitch circle diameter that is in the range of 2 to 2.6 times smaller than that of the hollow wheel of the first superimposed gear.

10. The modular transmission in accordance with claim 1, wherein:

the first shaft of the first superimposed gear and the first shaft of the second superimposed gear are each formed by the spacer of the respective first planetary wheel or the spacer of the respective second planetary wheel or elements coupled with them in a torque-transmitting manner;

the second shaft of the first superimposed gear is formed by the sun wheel of the first planetary wheel and the second shaft of the second superimposed gear is formed by the hollow wheel of the second planetary wheel;

the third shaft of the first superimposed gear is formed by the hollow wheel of the first planetary wheel and the third shaft of the second planetary wheel is formed by the sun wheel or an element coupled with it in a torque-transmitting manner.

11. The modular transmission in accordance with claim 10, wherein the sun wheel of the first planetary gear and the sun wheel of the second planetary gear are connected with each other in a torque-transmitting manner via a hollow shaft.

12. The modular transmission in accordance with claim 11, wherein the coupling between the gearbox input and the first shaft of the second superimposed gear takes place via a shaft connected in a torque-transmitting manner with the spacer of the first planetary wheel and guided through the hollow shaft.

13. The modular transmission in accordance with claim 10, wherein:

a first spur wheel of a first said linking gear is formed by the hollow wheel of the first superimposed gear;

a second said linking gear is formed by a spur wheel couple in a torque-transmitting manner with the third shaft designed as a hollow shaft and another spur wheel which is connected in a torque-transmitting manner with the continuously variable transmission.

14. The modular transmission in accordance with claim 1, wherein the continuously variable transmission is designed as a force-fit traction mechanism gearbox and a traction mechanism of the traction mechanism gearbox is formed by a belt or a chain.

15. The modular transmission in accordance with claim 14, wherein a means for a non-slip coupling of the traction mechanism to the revolution speed of the gearbox input is provided.

16. The modular transmission in accordance with claim 15, including means for equalizing the velocity of circulation of the traction mechanism to the revolution speed of the gearbox input comprising a transfer element that can be coupled at least indirectly with the gearbox input and connected in a force-fitting manner with the traction mechanism.

17. The modular transmission in accordance with claim 16, wherein the traction mechanism has a circumferential profile on its outer perimeter which can be attached with a complementarily designed profile on the outer perimeter of the transfer element.

18. The modular transmission in accordance with claim 17, wherein the transfer element is arranged coaxially to the gearbox input or parallel to it and, for the retention of the tension in the traction mechanism, a pivot gear is provided for the pivoting of disk arrangements of the continuously variable transmission and the transfer element.

19. The modular transmission in accordance with claim 18 wherein the transfer element is arranged coaxially to and in a torque-transmitting manner with the gearbox input or parallel to it and a movable or pivotable tensioning device is assigned to the traction mechanism for the retention of the tension.

20. The modular transmission in accordance with claim 1, wherein the means for controlling the gear transmission ratio on the traction mechanism box comprises actuating elements for adjusting the distances between individual disk arrangements.

21. The modular transmission in accordance with claim 1, wherein between the third shaft of the first superimposed gear and the third shaft of the second superimposed gear a transmission ratio of 1 to 2 through 3 can be set, or the transmission can be set between two individual disk arrangements at a ratio of 1 to 2 through 3.

22. The modular transmission in accordance with claim 10, wherein the gear box input is connected with a switchable starter unit.

23. The modular transmission in accordance with claim 1, wherein means for reversing the direction of rotation are provided.

24. The modular transmission in accordance with claim 23, wherein the means for reversing comprises a reverse gear.

25. The modular transmission in accordance with claim 1, wherein the first and/or the second clutch couplings are designed as frictionally engaged or synchronous clutch couplings.

26. The modular transmission in accordance with claim 1, wherein a starter element is switched into the gearbox input.

27. The modular transmission in accordance with claim 26, wherein the starter element is designed as a hydrodynamic rpm/torque converter or hydrodynamic clutch.

28. The modular transmission in accordance with claim 27, wherein a bridge clutch is assigned to the starter element.

29. The modular transmission in accordance with claim 28, wherein the starter element is designed as a multiple-disk clutch.

* * * * *